(12) United States Patent
Ishikawa et al.

(10) Patent No.: US 7,501,492 B2
(45) Date of Patent: Mar. 10, 2009

(54) PROCESSED SOYBEAN β-CONGLYCININ PROTEIN

(75) Inventors: Masahiro Ishikawa, Izumisano (JP);
Toshimitsu Baba, Izumisano (JP);
Tetsuhiko Okajima, Izumisano (JP);
Motohiko Hirotsuka, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 10/521,765

(22) PCT Filed: Jul. 22, 2003

(86) PCT No.: PCT/JP03/09282

§ 371 (c)(1),
(2), (4) Date: Jan. 19, 2005

(87) PCT Pub. No.: WO2004/110163

PCT Pub. Date: Dec. 23, 2004

(65) Prior Publication Data

US 2005/0175766 A1    Aug. 11, 2005

(30) Foreign Application Priority Data

Jul. 19, 2002   (JP) .............................. 2002-211845

(51) Int. Cl.
*A61K 36/48* (2006.01)
*A23J 1/14* (2006.01)

(52) U.S. Cl. ...................... 530/378; 530/412; 424/757; 426/656

(58) Field of Classification Search .................. 426/598, 426/656, 565; 435/410; 424/757; 530/378, 530/412
See application file for complete search history.

(56) References Cited

U.S. PATENT DOCUMENTS 6,171,640 B1    1/2001   Bringe
6,566,134 B2 *  5/2003   Bringe .................. 435/410

2001/0024677 A1 *  9/2001   Bringe .................. 426/656

FOREIGN PATENT DOCUMENTS

| EP | 1 323 353 | 7/2003 |
| JP | 11-308969 | 11/1999 |
| JP | 2002-238442 | 8/2002 |
| WO | 00/19839 | 4/2000 |

OTHER PUBLICATIONS

J.M.S. Renkema et al., "The effect of pH on heat denaturation and gel forming properties of soy proteins", Journal of Biotechnology, vol. 79, No. 3, pp. 223-230, 2000.
S. Petruccelli et al., "Soy Protein Isolate Components and Their Interactions", J. Agric. Food. Chem., vol. 43, No. 7, pp. 1762-1767, 1995.
T. Nagano et al., "Dynamic Viscoelastic Study on the Gelatin Properties of β-Conglycinin-Rich and Glycinin-Rich Soybean Protein Isolates", J. Agric. Food Chem., vol. 44, No. 11, pp. 3484-3488, 1996.
M.C. Puppo, et al., "Structural Properties of Heat-Induced Soy Protein Gels as Affected by Ionic Strength and pH", J. Agric. Food Chem., vol. 46, No. 9, pp. 3583-3589, 1998.
Database FSTA 'Online! International Food Information Service (IFIS), Frankfurt-Main, DE; 1975, K. Okubo, et al., "Food chemical studies on soybean proteins. XII. Effect of pH and heat on the solubility of water extracted protein.", XP002345737, Database accession No. 75-1-04-j0545.
Database WPI, Section Ch, Week 198412, Derwent Publications Ltd., London, GB; AN 1984-071565, XP002345927 & JP 59 025650 A (Fuji Oil Co., Ltd.), Feb. 9, 1984.
Database FSTA 'Online! International Food Information Service (IFIS), Frankfurt-Main, DE; 2001, E. N. C. Mills et al., "Formation of thermally induced aggregates of the soya globulin beta conglycinin.", XP002345738, Database accession No. 2001-00-g0577 & Biochimica et Biophysica Acta, 2001, 1547 (2) 339-350, 2001, Inst. of Food Res., Norwich Res. Park, Colney, Norwich NR4, 7US, UK.
Office Action (in English) issued Apr. 11, 2008 in the Chinese application corresponding to the present U.S. Application.

* cited by examiner

*Primary Examiner*—Maryam Monshipouri
*Assistant Examiner*—Marsha M Tsay
(74) *Attorney, Agent, or Firm*—Wenderoth, Lind & Ponack, L.L.P.

(57) ABSTRACT

By heating a solution or paste containing soybean β-conglycinin protein under acidic conditions, it is possible to provide soybean β-conglycinin protein whose high hydration property and high viscosity, which are problematic in various food processing using it or at the time of ingestion thereof, are improved.

2 Claims, No Drawings

PROCESSED SOYBEAN β-CONGLYCININ PROTEIN

This application is a 371 of PCT/JP03/09282, filed Jul. 22, 2003 which claims benefit to foreign application JP 2002-211845, filed Jul. 19, 2002.

1. Technical Field

The present invention relates to a process for producing β-conglycinin protein having a low hydration property, and β-conglycinin protein having a low hydration property and low viscosity obtained by the process, and a food comprising it.

2. Background Art

β-Conglycinin, which is fractionated from soybean proteins, is known to be quite effective for improvement of serum lipid (AOYAMA, Biosci. Biotechnol. Biochem., Vol. 65, No. 5, 1071-1075 2001, and JP 2002-114694 A). It is very useful if such β-conglycinin can be ingested in various forms including liquid foods such as drinks and soup, gel foods, and dry foods or semi-dry foods, such as bread, cookie and cake, tablets, and the like.

Many methods for obtaining β-conglycinin from soybeans have been hitherto investigated. Among them, one proposed method is to utilize β-conglycinin separated from β-conglycinin rich bred soybeans in meat, cheese, milk powder, substitute foods such as coffee creamer, general foods such as nutrition bars, drinks, powdery drinks and frozen desserts (U.S. Pat. No. 6,171,640 B1).

However, the protein rich in β-conglycinin has a remarkably high hydration property and viscosity as compared with a soybean protein isolate conventionally used for various foods. Then, various problems are caused due to formation of so-called undissolved lumps of a powder of the protein in various food processing using it. For example, in case where the protein is processed and ingested as a liquid food such as soup or miso soup, or a protein powder which is dissolved in water to drink, it is very difficult to disperse and dissolve the protein because of undissolved lumps thereof. In addition, a problem such as heavy mouth feel is caused because of high viscosity. Further, in case of a flour food or a starchy food such as bread, sponge cake or rice cracker, since β-conglycinin takes out water unevenly when added in dough, insufficient water absorption of wheat flour is resulted. Then, sometimes, formation of homogeneous dough is difficult, and molding is impossible except that an amount of water to be added is increased, a special molder is used, or manual molding is carried out because of remarkable increase in viscosity. Thus, there are many cases that β-conglycinin is hardly processed as various foods, and is hardly ingested in the form of foods because of its high hydration property and high viscosity.

As to a soybean protein isolate, wherein undissolved lumps of its powder upon dissolution in water are also problematic, though not to comparable with that of β-conglycinin protein, JP 59-25650 A (Literature A) discloses a technique for improving water dispersibility thereof in a solution by heating a dispersion thereof at about neutral pH (pH 5.8 to pH 6.2) and a high temperature such as not lower than 120° C. for 10 seconds or longer. However, this technique is directed to a normal soybean protein isolate having β-conglycinin content of about 30% or less and heating is conducted at a relatively high solubility pH range far from the isoelectric point. Therefore, this is different from the present invention directed to a protein having β-conglycinin content of 40% or more and heating it in an acidic range including the isoelectric point. Further, in the above Literature A, the dispersibility of the soybean protein isolate is further improved by incorporating granulation using lecithin and a fat as binders. However, the use of a fat causes flavor deterioration with time and, further, since β-conglycinin is effective for improving serum lipid, the use of a fat in improvement of dispersibility should be avoided as much as possible.

Thus, there has been no desired method for reducing a hydration property and high viscosity and improving a water reconstitution property of β-conglycinin protein without any problems in application and flavor.

An object of the present invention is to provide processed β-conglycinin protein whose high hydration property and high viscosity, which are great obstacles as to processing of β-conglycinin protein in the various form of foods or as to ingestion, are improved.

DISCLOSURE OF THE INVENTION

As a result of the investigation for improving a high hydration property and high viscosity of a solution of β-conglycinin protein, the present inventors have found that by heating an aqueous solution or paste of the protein under acidic conditions, solubility is reduced even after putting pH of the solution back to neutral conditions under which the protein is originally soluble, and as a result, a highly hydration property and high viscosity of β-conglycinin protein is reduced in a wide pH range to improve its water reconstitution property, thereby easily processing the protein as various foods and easily ingesting the protein. The present inventors further have investigated heating conditions of the protein solution under acidic conditions and, as the result, completed the present invention.

The present invention relates to a process for producing processed β-conglycinin protein having a low hydration property and low viscosity which comprises heating a solution containing β-conglycinin protein under acidic conditions to reduce the solubility of the protein. Further, the present invention relates to the processed β-conglycinin protein obtained by the above process and a food comprising it.

That is, the present invention relates to:

(1) A process for producing processed β-conglycinin protein which comprises heating a solution or paste containing β-conglycinin protein under acidic conditions;

(2) The process according to the above (1), wherein the acidic conditions are those at pH 3.5 to 6.0;

(3) The process according to the above (1), wherein the heating is carried out at higher than 75° C. but lower than 160° C.;

(4) β-Conglycinin protein having solubility of 70% or less in a neutral solution which is obtained by the process according to any one of the above (1) to (3); and (5) A food comprising β-conglycinin protein according to the above (4).

BEST MODE FOR CARRYING OUT THE INVENTION

In the present invention, β-conglycinin substantially corresponds to 7S globulin which is a globulin having an ultracentrifugal sedimentation coefficient of molecular weight of 7S among of globulins, i.e., a generic name of soluble soybean globular proteins. While β-Conglycinin generally consists of 3 subunits of α, α' and β, β-conglycinin lacking a part of the subunits may also be included. When an amount of β-conglycinin is referred to, it means the total amount of the actually existing subunits of α, α' and β. Further, in the present invention, β-conglycinin protein means the protein containing more β-conglycinin than a conventional soybean protein isolate. Usually, its purity in the protein exceeds 40%, and as the purity becomes higher, β-conglycinin can be ingested more easily.

β-conglycinin protein to be used in the present invention may be the protein obtained by any methods including the method of Thanh & Shibasaki (J. Agric. Food Chem., 24, 117 1976) as well as other methods such as a fractionation method utilizing the difference in isoelectric points (JP 55-124457A), a fractionation method utilizing the reactivity with calcium (JP 48-56843 A), a fractionation method utilizing the difference in solubility depending on pH and ionic strength (JP 49-31843 A, JP 58-36345 A and JP 5-43597 A), and a fraction method utilizing a cryophilic precipitation phenomenon and a reducing agent (JP 61-187755 A). In addition, β-conglycinin protein obtained from β-conglycinin rich bred soybeans may also be used (Breeding Science, 50, 101, 2000 and U.S. Pat. No. 6,171,640 B1).

In addition to the above methods, the preferred protein to be used includes β-conglycinin protein prepared according to a fractionation technique of β-conglycinin from defatted soybeans with a phytase (SAITO, Biosci. Biotechnol. Biochem., Vol. 65, No. 4, 884-887 2001), and β-conglycinin protein having high purity which is obtained by fractionation after warming a solution containing a soybean protein to 30 to 75° C. at pH 3.8 to 6.8 (WO 02/28198 A1). Alternatively, the protein to be used can also be prepared by a similar method which can fractionate β-conglycinin protein having high purity even in a lower pH range by controlling ionic strength when warming under acidic conditions (Japanese Patent Application No. 2002-328243). β-Conglycinin protein obtained by any methods including the above-mentioned methods can be used for the solution containing β-conglycinin protein to be used in the present invention. However, in case of using β-conglycinin protein as foods, it is preferred to carry out the protein without using a reducing agent because a wide range of applications can be expected.

For reducing the solubility, the solution or paste containing β-conglycinin protein is heated under acidic conditions of pH 3.5 to 6.0. When pH is out of this range, solubility is insufficiently reduced. Then, the high hydration property and high viscosity are not improved. In addition, solubility is greatly reduced by heating it in a pH range close to pH 4.5 to 5.0 which is the isoelectric point of β-conglycinin. Accordingly, β-conglycinin protein having much lower solubility can be obtained by heating at pH 3.8 to 5.8, particularly pH 4.0 to 5.6 though it depends on a heating temperature. The optimal degree of reduction of solubility is different according to a particular food using the protein.

Although a suitable heating temperature for reducing the solubility depends on pH, it may be higher than 75° C., preferably higher than or 85° C., and more preferably higher than or 95° C. When heating is carried out at a too low temperature, it is difficult to improve the high hydration property. On the other hand, heating at a too high temperature is not practical and, when the solution or paste is heated at higher than 160° C., sometimes, it is scorched. This is not preferred. Further, reduction of the solubility greatly depends on the factors of pH and temperature and the influence of the factor of heating time is not so much. In general, heating at a high temperature can be carried out for a shorter period of time, while heating at a low temperature needs a longer period of time.

The concentration of the solution or paste of β-conglycinin protein at the time of heating is not particularly limited, but it may be 5 to 20%, preferably 5 to 15% and more preferably 5 to 10%. When the concentration is high, aggregation lumps are formed by heating under the acidic conditions. Even when the concentration is low, aggregation lumps may also be formed. Sometimes, the aggregation lumps as such are problematic for processing after the heating under acidic conditions or for processing the protein as a food. Then, preferably, the aggregation lumps formed by heating under acidic conditions are ground by a wet grinder or the like. Further, even if the aggregation lumps are ground by a wet grinder, etc., sometimes, β-conglycinin protein obtained by drying which has reduced solubility contains coarse particles. Then, the protein gives rough mouth feel, when the protein is used in liquid foods such as drinks and soup. Thus, preferably, the solution is homogenized by a high pressure homogenizer, etc.

β-Conglycinin protein prepared by one of the above methods has a high hydration property, high viscosity and has solubility of 90% or more (see hereinafter) in a neutral solution (pH 7.0) without heating under the acidic conditions. However, the solubility in a neutral solution becomes 70% or lower when subjected to heating under the acidic conditions. Thus, evident reduction of a hydration property and viscosity can be recognized.

The solution or paste containing β-conglycinin protein having reduced solubility obtained by the above treatment may be used as such, or after concentration, neutralization or sterilization. Alternatively, from the view points of storability and usability, it is practical to use the protein as dried β-conglycinin protein having reduced solubility obtained by drying with a drier such as a spray dryer after neutralization and sterilization. However, sometimes, when the solution or paste containing β-conglycinin having reduced solubility is brought to pH of higher than 6.0 and then sterilized at a high temperature, the solubility somewhat increases, and the hydration property and viscosity revert. In that case, certain treatment can be conducted in advance by taking such a phenomenon into account, for example, the heating under acidic conditions is carried out under more stronger conditions.

From the practical viewpoint, examples the means for the above mentioned concentration include so-called isoelectric separation wherein the resultant is once diluted with water or desalinized to control its ionic strength to less than 0.2 and pH 4.0 to 5.0, followed by separation of an insoluble fraction. Then, water is added thereto, the mixture is neutralized, sterilize by heating and dried. The heating can be carried out by known HTST, UHT treatment and the like.

The solubility of β-conglycinin protein having reduced solubility obtained by the above mentioned process is 70% or lower in a neutral solution (pH 7.0). As mentioned above, the protein having the solubility of 60% or lower, 50% or lower, or 40% or lower can also be obtained by selecting heating conditions, and can be appropriately selected according to particular use. If the solubility is higher than 70%, such a protein is not suitable because it has an inferior water reconstruction property and high viscosity at the time of processing it as various foods of ingestion as foods.

The purity of β-conglycinin protein is not particularly limited but, when the purity is 40% or higher, preferably 60% or higher and more preferably 70% or higher, β-conglycinin can be ingested or processed more efficiently. Thus obtained β-conglycinin protein can be used for various foods such as tablets, powdery drinks, foods such as baked confectionery, flour or starchy foods, various premixes and the like.

Hereinafter, as examples of various foods containing β-conglycinin protein, processing the protein as tablets, protein powders and rice cracker-like foods is illustrated.

Tablets can be obtained by using a powdery mixture or a granulated mixture containing β-conglycinin protein, filling the mixture into the mold of a conventional tablet machine used for producing tablets and compressing it. The content of β-conglycinin protein in tablets can be 80% by weight or lower. When the content is higher than 80% by weight, hardness of tablets becomes insufficient so that cracks are easily caused. Preferably, for ingestion of β-conglycinin, β-conglycinin content is 20% by weight or higher, preferably 30% by weight or higher, more preferably 40% by weight or higher. In addition to β-conglycinin protein, tablets may further contain saccharides, and it is possible to produce tablets having various hardness and mouth feel or flavors by appropriately selecting saccharides. Further, tablets which are excellent in a luxurious property can be obtained by addition of milk powder, cocoa powder, powdery juices, organic acids, food flavors and the like, and, in order to improve a compression property, emulsifiers, polysaccharides, silicon dioxide and the like can also be added.

Meanwhile, tablets containing β-conglycinin protein without the processing of the present invention are difficult to eat because they stick to teeth by chewing due to high viscosity. Further, because the bulk specific gravity of β-conglycinin protein is low, when this powder is used mainly, weight per tablet cannot be increased due to the relation to the mortar volume of a tablet machine. Furthermore, because high pressure is required for obtaining hardness, this is not preferable for a table machine. On the other hand, by subjecting the processing, the bulk specific gravity of β-conglycinin can be increased, thereby avoiding to stick to teeth by chewing and solving the above problems concerning to workability and quality of tablets.

Powdery drinks can be obtained by mixing a powder containing β-conglycinin protein with a powder containing other raw materials, and preferably granulating the resulting mixture. Examples thereof include powder drinks using flavor agents such as powdery soup, powdery miso soup, coffee powder and the like, and protein powders having a higher content of β-conglycinin protein. The content of β-conglycinin protein is not particularly limited, but the content can be 20% by weight or higher, preferably 30% by weight or higher, and more preferably 40% by weight or higher in view of efficient ingestion of β-conglycinin. In case of a protein powder, for the purpose of ingesting the protein, the powder preferably contains 70% by weight or more thereof based on the weight of raw materials. For powdery drinks, there can be used powders of vegetables, potatoes, beans, cereals and the like, powdery miso, soy sauce powder, seasonings, fruit juices, coffee powder, cocoa powder, milk powder, saccharides, starches, flavors, acidulants and the like, without limitation. When unprocessed β-conglycinin protein is used, the formation of undissolved lumps can be improved by granulation, but the improvement becomes harder as the content is increased. Particularly, when the amount of β-conglycinin protein to be used exceeds 50% by weight, it is difficult to obtain an end product having suitable properties because of difficulty in obtaining sufficient dispersibility, and further an increase in viscosity by granulation.

On the other hand, when processed β-conglycinin protein is used, and further it is granulated, powdery drinks having suitable dispersibility without any increase in viscosity can be obtained even if it is used for a food highly a high content thereof such as a protein powder.

Foods such as rice cracker-like foods can be obtained by heating hydrated dough to expand (puff) it. In order to ingest β-conglycinin, the content of β-conglycinin protein is suitably 20% by weight or higher, preferably 30% by weight or higher, and more preferably 40% by weight or higher in the solids content. Further, by adding other raw materials, the mouth feel and flavor can be controlled and, in this case, the content of β-conglycinin protein is suitably 90% by weight or lower. In a formulation, there can be added starchy substances such as corn starch, waxy corn starch, potato starch, tapioca starch, wheat starch and rice starch, modified starch thereof, cereal powders such as wheat flour and rice powder, fats and oils and the like to improve a luxurious property. In addition, for flavoring dough, spices and seasonings can be added. When water is added to such a powder mixture containing β-conglycinin protein to prepare dough, if unprocessed β-conglycinin protein is used, undissolved lumps are formed and homogeneous dough cannot be obtained. Particularly, a high content such as 50% by weight or higher in a solids content is hardly obtainable. On the other hand, in case of the processed β-conglycinin protein, undissolved lumps are scarcely formed, and the protein can be mixed with a conventional vertical mixer to be used for normal mixing. However, a degree of expansion tends to decrease in the case of processed protein and, when expansion is insufficient, sometimes, the end product becomes too hard. In this case, it is possible to optimize both water dispersibility and a degree of expansion by appropriately replacing processed β-conglycinin protein with unprocessed β-conglycinin protein.

EXAMPLES

Hereinafter, the present invention is specifically explained by Examples. However, the technical scope of the present invention is not limited by these Examples.

Solubility: An aqueous solution containing 1% by weight of a sample was adjusted to pH 7.0 and the proportion of an amount of a protein in a supernatant obtain by centrifugation at 8,000 g for 5 minutes to the total amount of the protein in the aqueous solution was determined by Kjeldahl method.

SDS-polyacrylamide gel electrophoresis: A sample was analyzed by the method by Laemmli (Nature, 227, 680 1970), with a gradient gel at gel concentration of 10 to 20%. The applied amount of protein was 5 μg.

Phytic acid: Phytic acid was determined according to the method by Alii Mohamed (Cereal Chemistry, 63, 475-478 1986).

Chloroform/methanol oil content: Fifty-fold of a mixture of chloroform/methanol (2:1 by volume) was added to a dried sample to extract an oil fraction at 160° C., followed by weighing the fraction to calculate chloroform/methanol oil content.

Purity (SPE basis): The areas of the electrophoresis migration pattern obtained by the above SDS-polyacrylamide gel electrophoresis were measured by a densitometer, and the area proportion of the area of β-conglycinin fraction to the total areas was calculated to obtain the purity (SPE basis). Herein, the content of β-conglycinin means total amounts of α, α' and β subunits. In addition to this method, as described hereinafter, purity is also determined as corrected purity by taking an amount of an intermingled oil body-associated protein (SAMOTO, Biosci. Biotechnol. Biochem., Vol. 62, No. 5 935-940 1998) into consideration. However, the present invention refers to the purity of β-conglycinin protein as that by SPE basis.

Corrected purity: By taking the purity of a sample (SPE basis) as A %, the corrected purity is calculated as the purity based on the total protein obtained by subtracting the amount of oil body-associated protein from the SPE value as shown in the following equation because oil body-associated protein corresponding to 10 times by weight of the amount of chloroform/methanol oil content intermingles in the sample.

Corrected Purity (%)=(100(%)−Chloroform/methanol oil content (%))×10)×A(%)/100

Evaluation of water reconstruction property: Water (300 g) at 20° C. was placed in a 500 ml beaker, to this was added a dried powder of β-conglycinin (9 g) with stirring at 300 rpm by an octagon stirrer (35 mm length×7.5 mm diameter), and the mixture was stirred for 5 minutes. Then, the mixture was poured on a 16 mesh sieve and dried weight of undissolved lumps of β-conglycinin remained on the sieve was measured to determine the proportion of lumps. The smaller proportion of undissolved lumps represents a better water reconstruction property. This was expressed as follows: less than ¼ as ◎; ¼ to less than ²⁄₄ as ○; ²⁄₄ to less than ¾ as Δ; and more than or ¾ as x.

Example 1

Soybeans were pressed and extracted to remove oil with n-hexane as an extraction solvent. To 1 part by weight of the resultant low denaturation defatted soybean was added 10 parts by weight of extraction water (50° C.), and the mixture was adjusted to pH 5.3 with hydrochloric acid and extracted for 30 minutes. This extraction slurry was adjusted to pH 5.5 with caustic soda, and centrifuged by a batch-wise centrifuge (3,000 g). The solution temperature at the time of centrifugation was about 45° C. After adjusting a temperature of the soluble fraction obtained to 50° C., phytase of 8 units per protein weight (manufactured by NOVO, "PHYTASE NOVO L") was added thereto, and the fraction was digested by the enzyme, cooled to about 20° C., adjusted to pH 4.9 with hydrochloric acid and centrifuged to obtain precipitated curd of low phytic acid β-conglycinin (the process described in WO 02/28198 A1). The precipitated curd was homogenized with 5 times by weight of water (solid content 6.7%), adjusted to pH 3.3, 3.8, 4.0, 5.0, 5.5, 5.8, 6.0 or 7.0 with caustic soda or hydrochloric acid, and heated at 65° C., 85° C., 100° C. or 140° C. for 10 seconds, then immediately spray-dried to obtain powdered β-conglycinin protein. Purity of β-conglycinin of the powder obtained was 93%. Solubility (%) at pH 7.0 in a neutral solution and a water reconstruction property of the powder of β-conglycinin protein obtained by heating under respective conditions are shown in Table 1.

TABLE 1

|        | pH 3.3 | pH 3.8 | pH 4.0 | pH 5.0 | pH 5.5 | pH 5.8 | pH 6.0 | pH 7.0 |
|--------|--------|--------|--------|--------|--------|--------|--------|--------|
| 65° C. | X (99) | X (98) | X (93) | X (85) | X (88) | X (93) | X (96) | X (99) |
| 85° C. | X (98) | X (92) | ○ (66) | ◎ (37) | ○ (62) | X (86) | X (94) | X (99) |
| 100° C.| X (98) | X (82) | ○ (66) | ◎ (22) | ◎ (38) | ○ (60) | Δ (70) | X (99) |
| 140° C.| X (98) | Δ (68) | ○ (56) | ◎ (10) | ◎ (30) | ○ (58) | Δ (67) | X (99) |

As seen from the above results, in case of heating under neutral or strongly acidic conditions or at a temperature of 75° C. or lower, the solubility of β-conglycinin protein obtained is not reduced, while β-conglycinin protein having the solubility of 70% or lower can be obtained by heating at a temperature of higher than 75° C. under acidic conditions.

Example 2

Water was added to the precipitated curd of low phytic acid β-conglycinin protein prepared according to the same manner as that of Example 1 and the mixture was homogenized (solids content 14.2%), adjusted to pH 5.5 with caustic soda and heated at 120° C. for 10 seconds. Then, aggregating lumps formed were ground by Comitrol (manufactured by URSCHEL LABORATRIES, INC.), and the resultant was adjusted to pH 6.0 with caustic soda, sterilized by heating at 142° C. for 7 seconds, and immediately spray-dried to obtain a powder of β-conglycinin protein. Purity of β-conglycinin of the powder obtained was 93%, and the solubility at pH 7.0 was 34%.

Example 3

Tablets (Tablet Confectionery)

The precipitated curd of low phytic acid β-conglycinin protein prepared according to the same manner as that in Example 1 was homogenized with 5 times by weight of water (solids content 6.7%), adjusted to pH 5.5 with caustic soda and heated at 120° C. for 10 seconds. Then, aggregating lumps formed were ground by Comitrol (manufactured by URSCHEL LABORATRIES, INC.), and the resultant was adjusted to pH 6.0 with caustic soda and sterilized by heating at 142° C. for 7 seconds, and immediately spray-dried to obtain a powder of β-conglycinin protein (T-1: solubility at pH 7.0 was 38%). A mixture of 32 parts by weight of T-1 obtained and 68 parts of malt sugar was granulated by a fluidized bed with 15 parts of a 0.2% by weight guar gum aqueous solution as a binder. To the granules obtained were added 3 parts of DK ester F-20W (manufactured by DAI-ICHI KOGYO SEIYAKU CO., LTD.), 1 part of powdered lemon juice, 0.5 part of powdered lemon flavor and 1 part of citric acid, and the resultant mixture was applied to a tablet machine to prepare tablets of 20 mm diameter (1.7 g/tablet). The tablets obtained had no problem of powder fluidity and molding at the time of compression and was well to be chewed with no sticking to teeth. On the other hand, for comparison, the precipitated curd was homogenized with 5 times weight of water (solids content 6.7%), without heating under acidic conditions, adjusted to pH 7.0 with caustic soda. Then, similarly, the resultant was subjected to heat sterilization and spray drying to obtain unprocessed powder of β-conglycinin protein (C-1: solubility at pH 7.0 was 99%). By using this powder, similarly, tablets of 20 mm diameter were prepared, but it was very difficult to chew with sticking to teeth.

In view of the above results, it has been shown that tablets having good mouth feel can be obtained by using processed β-conglycinin protein.

Example 4

Powdery Drinks

The precipitated curd of low phytic acid β-conglycinin protein prepared according to the same manner as that of Example 1 was homogenized with 5 times by weight of water (solids content 6.7%), adjusted to pH 5.8 with caustic soda and heated at 120° C. for 10 seconds. Then, aggregating lumps formed was ground by a commit roll (manufactured by URSCHEL LABORATRIES, INC.), and the resultant was further homogenized with a high pressure homogenizer (manufactured by IZUMI FOOD MACHINERY CO., LTD., 150 kgf/cm$^2$), adjusted to pH 6.0 with caustic soda, sterilized by heating at 142° C. for 7 seconds, and immediately spray-dried to obtain a powder of β-conglycinin protein (T-2; solubility at pH 7.0 was 68%). A mixture of 90 parts by weight of T-2 thus obtained or C-1 β-conglycinin protein obtained in Example 3, 9 parts of malt sugar and 1 part of cocoa flavor was granulated in a fluidized bed with 10 parts of a 4% by weight aqueous Ryoto Sugar ester S-570 solution (manufactured by MITSUBISHIKAGAKU FOODS CORPORATION) as a binder to prepare a protein powder. To 100 g of water was added 5 g of the protein powder and the mixture was lightly stirred. As a result, the protein powder prepared using T-2 was dispersed uniformly and with no rough mouth feel, while the protein powder prepared using C-1 could not be dispersed uniformly with undissolved lumps.

Example 5

Rice Cracker-like Foods

A mix composed of 70 parts of T-1, C-1 or a 1:1 mixture of T-1 and C-1, 25 parts of rice flour and 5 parts of "Norisio" (trade name) seasoning powder was placed in a mixer. To this was gradually added 200 parts of water and the resultant was kneaded to prepare dough. The dough obtained was divided into 8 g portions, and they were subjected to sandwich-baking by sandwiching between iron plates maintained at 180° C. and heating for 6 minutes to expand the dough, and dried for 3 hours under air-blowing conditions with air at 50° C. to prepare a rice cracker-like food.

When T-1 and the 1:1 mixture of T-1 and C-1 were used, uniform dough was prepared. On the other hand, when C-1 was used, dough was not uniform with many undissolved lumps. Further, as to expansion by sandwich-baking, the dough using T-1 was a less expansion, while the dough using the 1:1 mixture of T-1 and C-1 was suitably expanded. As to mouth feel, the product using the 1:1 mixture of T-1 and C-1 showed suitably crispy mouth feel, and it was most preferred one. On the other hand, the product using T-1 is somewhat hard and has less desired mouth feel. In view of the above results, the use of processed β-conglycinin protein makes the preparation of dough be easy and further a rice cracker-like food having suitable mouth feel can be obtained.

INDUSTRIAL APPLICABILITY

According to the present invention, by heating a solution or paste containing soybean β-conglycinin protein under acidic conditions, it is possible to provide soybean β-conglycinin protein whose high hydration property and high viscosity, which are problematic in various food processing using it or at the time of ingestion thereof, are improved.

The invention claimed is:

1. A process for producing dry β-conglycinin protein which comprises heating a solution or paste having a concentration of 5 to 20% of β-conglycinin protein whose β-conglycinin content is 40% by weight or more in the protein at higher than 75° C. but lower than 160° C. under acidic conditions of pH 3.5 to 6.0 at an ionic strength of less than 0.2 and then, after neutralizing and sterilizing, spray-drying the solution or paste.

2. The process according to claim 1, wherein the acidic conditions are those at pH 4.0 to 5.6.

* * * * *